Oct. 27, 1925.

A. C. SACHSE 1,559,464

SPOTLIGHT ATTACHMENT

Filed Sept. 24, 1924

Inventor

ARTHUR C. SACHSE,

By E. Anne Talbert

Attorney

Patented Oct. 27, 1925.

1,559,464

UNITED STATES PATENT OFFICE.

ARTHUR C. SACHSE, OF DETROIT, MICHIGAN.

SPOTLIGHT ATTACHMENT.

Application filed September 24, 1924. Serial No. 739,652.

*To all whom it may concern:*

Be it known that ARTHUR C. SACHSE, a citizen of the United States of America, residing at Detroit, in the county of Wayne and State of Michigan, has invented new and useful Improvements in Spotlight Attachments, of which the following is a specification.

The purpose of the invention is to provide a device for use in connection with spotlights to eliminate side glare on the left hand side of the vehicle on which it is used by reducing the intensity of the rays directed to the left but not entirely obstructing them, at the same time directing the bright rays toward the right hand side of the road; and to produce a device of simple construction, thus making it possible of production quickly and cheaply.

With this purpose in view, the invention consists in the construction and combination of parts of which a preferred embodiment is illustrated in the accompanying drawings, wherein.

Figure 1:
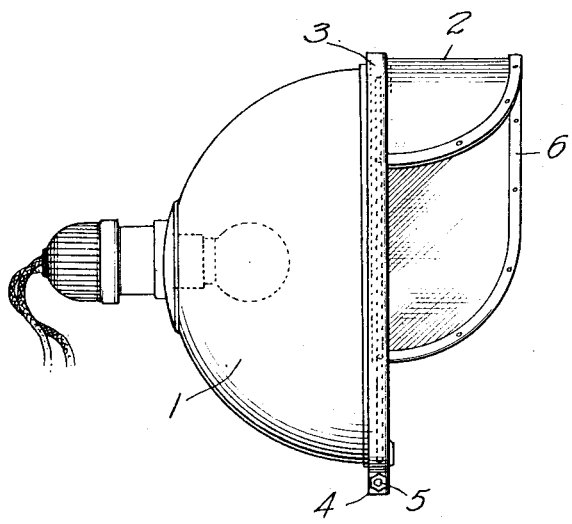
Figure 1 is a side elevational view of a spotlight with the invention shown applied thereto.

Adapted for attachment to the conventional form of spotlight 1, the device comprising a visor or shield 2 and a connected attaching band or strap 3 adapted for disposition in surrounding relation with the spotlight casing or lens easel as shown and provided with terminal ears 4 through which a clamping bolt 5 extends for the circumferential contraction of the band on the lamp casing or lens easel.

The visor or shield 2, which is light penetrable, is colored to soften the rays projecting therethrough and is preferably green. In order that it may be flexible to permit ready attachment and conform to the contour of the lamp casing, the visor or shield 2 is preferably celluloid and is secured to the attaching band 3 in any acceptable manner, the forward edge being provided with a marginal binding strap 6, preferably of metal but thin enough to readily permit flexing. Obviously, the visor or shield may be adjusted in position on the lamp to secure the most acceptable arrangement.

Figure 2:
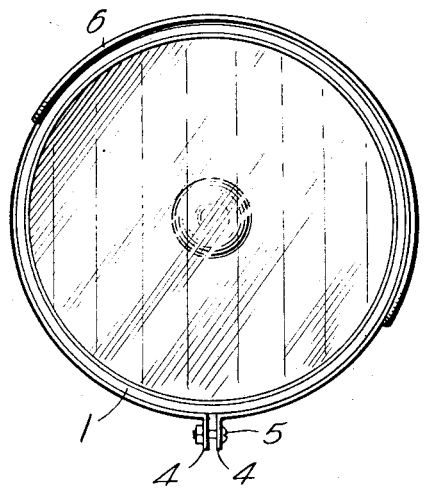
Figure 2 is a front elevational view of the structure of Figure 1.

In length the visor or shield 2 is preferably half the circumference of the lamp casing to which it is attached and is preferably positioned to occupy a position as shown in Figure 2, covering the whole of the upper left quadrant of the lamp, slightly less than half the lower left quadrant, and a portion in excess of half the upper right quadrant.

Figure 3:
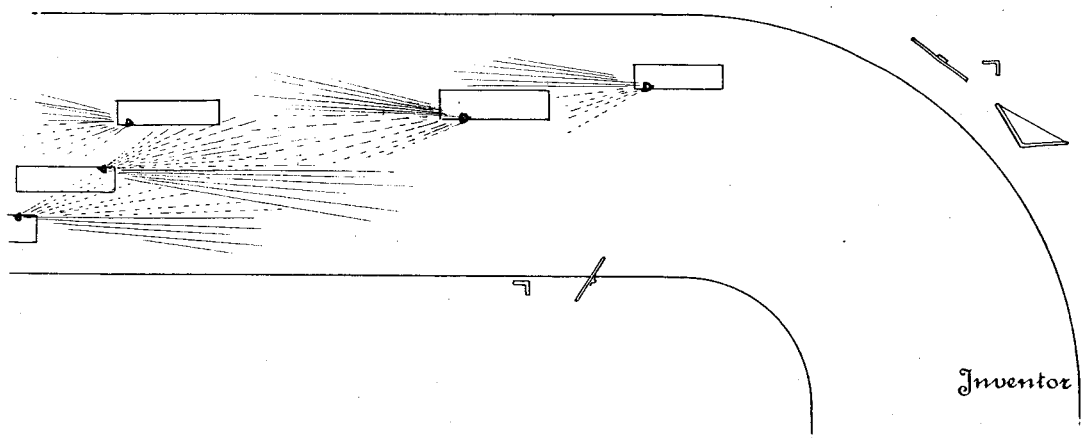
Figure 3 is a diagrammatic view illustrating the manner in which the device functions when in use.

By this means of attachment, the lamp lens is practically completely shielded from the moisture when driving through rain and those rays which would obstruct the vision of an approaching driver penetrate the visor or shield and are softened and thus the present objection to the use of spotlights is eliminated. The bright rays, however, are directed to the right hand side of the road and fully illuminate the latter and thus enable the driver of the car on which the device is used to operate the car safely, the diagrammatic view in Figure 3 illustrating in full lines the bright rays and in dotted lines the softened rays penetrating the visor or shield.

The area of diffusion of the bright rays is defined by that portion of the shield or visor extending from the lower left hand end to the point of intersection of the vertical diametrical line of the lamp lens, the remaining portion of the shield or visor acting to protect the lens from the rain as well as to diffuse the upwardly projecting rays.

The invention having been described, what is claimed as new and useful is:

In combination with a vehicle headlight having a lens, a shield or visor extending forwardly of the lens and made of a colored transparent material, said shield or visor being of a length substantially half the circumference of the lens and occupying a position covering the whole of the upper left quadrant, slightly less than half the lower left quadrant, and a portion in excess of half of the upper right quadrant.

In testimony whereof he affixes his signature.

ARTHUR C. SACHSE.